United States Patent Office 2,809,130
Patented Oct. 8, 1957

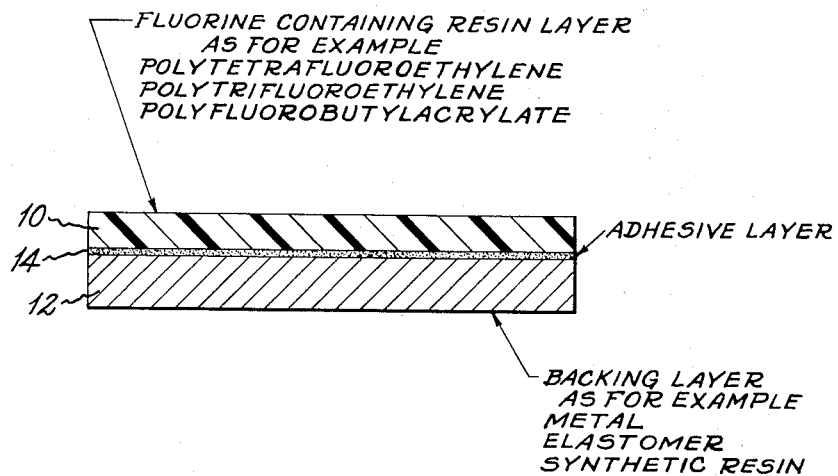

2,809,130

METHOD OF BONDING A FLUORINATED SYNTHETIC RESIN TO ANOTHER MATERIAL

George Rappaport, Dayton, Ohio, assignor to General Motors Corporation, Detroit, Mich., a corporation of Delaware Application May 18, 1956, Serial No. 585,702

7 Claims. (Cl. 117—138.8)

This invention relates to a process for obtaining bonds between fluorine containing synthetic resins and other materials and is particularly concerned with a method of preparing fluorine containing synthetic resin surfaces for subsequent adhesion to the surface of other materials.

Synthetic resins having a relatively high fluorine content, such as polytetrafluoroethylene and polytrifluorochloroethylene, have been developed which have a variety of applications as for example coatings for metals and other substances, fabric and flexible sheet material, and as relatively rigid articles, which take advantage of the relatively low coefficient of friction and high chemical and thermal stability of these materials. Resins having a relatively high fluorine content such as polytetrafluoroethylene may not be readily and satisfactorily bonded to itself or other material such as metals, elastomers, synthetic resins and the like.

One known method of bonding polytetrafluoroethylene to other materials involves treating the polytetrafluoroethylene surface to which another material is to be bonded, with a solution of sodium in liquid ammonia prior to an application of an adhesion cement between the surfaces to be bonded. The basic disadvantage of this method is in the inconvenience and hazard of handling liquid ammonia and the sodium ammonia solution. The sodium ammonia solution must be handled under an exhaust providing hood and since it is inconvenient to operate a hood continuously for several days or weeks, each batch of the sodium ammonia solution must be deactivated and disposed of after each period of use thereof.

It is an object of this invention to provide a method of bonding a fluorine containing synthetic resin part to another part which includes the step of treating a surface of the fluorine containing resin part with an alkali metal polyaryl hydrocarbon-solvent solution and thereafter bonding the treated surface to the other part through the medium of an adhesion cement.

It is a more specific object of this invention to provide a method of bonding a polytetrafluoroethylene part to another part which includes the step of treating a surface of the polytetrafluoroethylene part to be bonded to another part with an alkali metal polyaryl hydrocarbon-solvent solution.

The alkali metal aryl solvent solutions involved in the present invention require only conventional ventilation. They are effective at room temperatures and unused portions may be stored for an indefinite period.

Further objects and advantages of the present invention will be apparent from the following description, reference being had to the accompanying drawings wherein preferred embodiments of the present invention are clearly shown.

In the drawings:

Figure 1 is a fluorinated synthetic resin part bonded to a backing member in accordance with the present invention.

The bonding of fluorinated resins such as Teflon (polytetrafluoroethylene) presents great difficulties because of the nonwetting properties of the resin and the lack of organic solvents for them. For example, no solvents are known for Teflon and no adhesive cements have been developed which are capable of bonding Teflon to itself or other materials without a suitable treatment of the Teflon surfaces. A method of bonding Teflon to other materials which involves treating the Teflon surface with a sodium ammonia solution is effective but as pointed out above has serious handling disadvantages.

The present invention involves forming a laminated article as for example is shown in Figure 1 of the drawings which includes a fluorinated resin part 10 bonded to another or supporting part 12 through the medium of an adhesion cement layer 14. The invention deals primarily with synthetic resins containing fluorine which are not attacked or appreciably attacked by organic solvents and which may not be satisfactorily bonded to themselves or other materials through the medium of presently known adhesion cements. Among such materials, polytetrafluoroethylene, polytrifluorochloroethylene and polyfluorobutyl acrylate may be named.

The supporting part 12 may be any of the wide variety of materials such as a metal, an elastomeric material such as natural rubber, butadiene-acrylonitrile copolymer, butadiene-styrene copolymer, polychloroprene, etc., thermosetting and thermoplastic resins such as the phenolic and vinyl resins, and virtually any material which may be successfully bonded to itself or another material through the medium of a suitable adhesion cement.

In accordance with the present invention the surface of the fluorinated resin 10 which it is desired to bond to a suitable material 12, is first treated with a suitable alkali metal aryl hydrocarbon-solvent. Compounds which have been found suitable for this purpose include the alkali metal polyaryl hydrocarbon-solvent solutions. Specific solutions which are suitable include solvent solutions of sodium naphthalene, sodium diphenyl, sodium anthracene, and reaction products of sodium and the alkyl derivatives of naphthalene, diphenyl and anthracene. Solutions of addition products of these polyaryl compounds with other alkali metals such as potassium and lithium are also suitable, however sodium is the preferred alkali metal because of its relative cheapness and availability. These compounds may be prepared by dissolving the polyaryl compound in a suitable solvent such as dimethyl glycol ether or dimethyl ether and subsequently adding the alkali metal in metallic form as is disclosed in the paper by Messrs. Scott, Walker and Hansley entitled, A new method for the preparation of addition compounds of alkali metals and polycyclic aromatic hydrocarbons, volume 58 of the Journal of American Chemical Society, page 2442. Addition compounds of alkali metal and polyaryl hydrocarbons of the type useful in the present invention are also disclosed in the U. S. Patents 2,019,832 and 2,023,793. Although dimethyl ether and various fully alkylated glycols and polyhydric alcohols, trimethylamine and other aminol compounds are effective solvents for alkali metal addition reactions with the polyaryl or polycyclic aromatic hydrocarbons, dimethyl glycol ether is preferred because it is not attacked by the alkali metal polyaryl addition compound.

For treatment of the fluorinated resin surfaces in accordance with the present invention the ratio of solvent to the alkali polyaryl addition compound is not critical since the presence of the latter compound in the solvent is the only prerequisite for effective treatment.

After the fluorinated resin surface is treated with the alkali metal polyaryl solvent solution, a suitable adhesive cement 14 is applied between the treated surface of the resin layer 10 and the supporting material 12 and the cement is permitted to set or cure preferably under pressure and under temperature conditions best suited for the specific cement used. The surface of the material 12 to which the fluorine containing resin is bonded, is cleaned and otherwise prepared so as to provide a firm bond between the cement and the layer 12 in accordance with the practices well known in the art. The specific treatment applied to the material 12 will, of course, be dependent on the nature of the material and to some extent on the nature of the cement.

A wide variety of addition cements have been found to be suitable for joining the fluorinated resin surface, as for example, the surface of Teflon, to other materials in accordance with the present invention. Among these are chlorinated rubber type cements such as "Loxite" manufactured by The Firestone Tire and Rubber Company which essentially is dichloro butadiene plus a chlorinated elastomer and is fully disclosed in the Kuhn Patent 2,581,920. Other suitable adhesives include "Penacolite G-1124" which is a resorcinol formaldehyde resin cement sold by Koppers Company, "Phenoline 300," a phenolic resin cement sold by the Carboline Company and "Plastilock 604" sold by the B. F. Goodrich Company, which is essentially a blend of a phenolic resin and a butadiene-acrylonitrile copolymer. Still other suitable adhesive cements include the epoxy resin cements "R-313" sold by the Carl H. Biggs Company, "Bondmaster M-24 and M-611" sold by the Rubber and Asbestos Corporation, "Miracle Adweld W-799" and "Miracle Epoxy Complex NP-285", sold by the Miracle Adhesive Corporation and "Ply Master V-2," a Fiberglas reinforced epoxy resin cement sold by the Rubber and Asbestos Corporation. The specific cement to be used is dependent on the nature of the laminate 12 and the specific fluorinated resin and the character of bond desired. The specific cement used, however, forms no part of the present invention.

The method of the present invention may be illustrated by a specific example as follows: A liter of a molal solution of naphthalene in a dimethyl glycol ether solvent was provided with a nitrogen atmosphere and metallic sodium was added. As soon as the reaction commenced and the solution assumed a greenish color indicating the presence of sodium naphthalene, a Teflon strip was immersed in the solution for about 5 minutes. Thereafter the treated surface was placed against a phenol-formaldehyde resin surface coated with an epoxy resin cement, under pressure. After the cement was allowed to cure the bonded article was subjected to a peel test and the bond was found to be stronger than the Teflon. Similar results were obtained in bonding the Teflon to metal and rubber using "Loxite" as a cement and the same Teflon surface treatment. In addition to treatment with sodium naphthalene solvent solution, treatment with dimethyl glycol ether solutions of sodium diphenyl and sodium anthracene was found effective. Other alkali metals such as potassium and lithium may also be used in the alkali polyaryl compound. As above indicated satisfactory treatment may be obtained as soon as the presence of the alkali metal aryl compound is noted in the reacting solution. However the duration of treatment of the fluorine containing resin surface may be reduced by increasing the concentration of the alkali metal aryl compound.

In treating fluorine containing synthetic resins with the alkali metal polyaryl hydrocarbon-solvent solution, preferably only the portions of the resin surface to be subsequently adhered to another article is subjected to the solution. The bonding process is carried out in the conventional manner after the resin surface treatment as for example wherein one of the surfaces to be bonded are coated with a suitable cement and the two surfaces are brought together under conditions of temperature and pressure best suited for the type of adhesion cement used.

The alkali metal polyaryl hydrocarbon-solvent solution involved in the present invention may be readily prepared as above described and the handling, use and storage of unused portions involve no hazard or inconvenience other than that associated with handling a metallic alkali metal and common organic solvents.

The method of the present invention has a wide variety of applications wherein it is desirable to bond a fluorinated resin such as Teflon to metals, synthetic resins and elastomers. For example Teflon bearing layers may be bonded to metal or synthetic resins such as fiber filled phenolics, nylon and the like. Fluid seals may desirably have Teflon portions bonded to elastomeric portions. Teflon gaskets and seal members may be advantageously bonded to supporting members.

While the embodiments of the present invention as herein disclosed constitute preferred forms, it is to be understood that other forms might be adopted.

What is claimed is as follows:

1. In a method for bonding a fluorinated synthetic resin material to another material through the medium of an adhesion cement, the step of subjecting the resin surface to be bonded to the other material to an alkali metal polyaryl hydrocarbon-solvent solution before the application of an adhesion cement thereto.

2. In a method for bonding a fluorinated synthetic resin material to another material through the medium of an adhesion cement, the step of bringing the resin surface to be bonded to the other material in contact with an alkali metal naphthalene-solvent solution before the application of an adhesion cement thereto.

3. In a method for bonding a fluorinated synthetic resin material to another material through the medium of an adhesion cement, the step of subjecting the resin surface to be bonded to the other material, to a sodium naphthalene-solvent solution before the application of an adhesion cement thereto.

4. In a method for bonding a polytetrafluorine article to another article through the medium of an adhesion cement, the step of subjecting the polytetrafluoroethylene surface to be bonded to the other article, to a solution of sodium naphthalene in dimethyl glycol ether, before the application of an adhesion cement thereto.

5. Claim 1 wherein the polyaryl-hydrocarbon is selected from a group consisting of naphthalene, diphenyl, anthracene, and alkyl substituted derivatives thereof.

6. In a method for bonding a polytetrafluoroethylene article to another article through the medium of an adhesion cement, the step of subjecting the polytetrafluoroethylene surface to be bonded to the other article, to a solution in dimethyl glycol ether of an alkali metal polyaryl hydrocarbon wherein the polyaryl hydrocarbon is selected from the group consisting of naphthalene, diphenyl, anthracene and alkyl substituted derivatives thereof, before the application of an adhesion cement thereto.

7. Claim 6 wherein said alkali metal is sodium.

References Cited in the file of this patent

UNITED STATES PATENTS

| | | |
|---|---|---|
| 2,705,691 | Panagrossi et al. | Apr. 5, 1955 |
| 2,728,698 | Rudner | Dec. 27, 1955 |
| 2,736,680 | Kidwell | Feb. 28, 1956 |

FOREIGN PATENTS

| | | |
|---|---|---|
| 660,398 | Great Britain | Nov. 7, 1951 |